United States Patent [19]

Calundann

[11] 4,184,996
[45] Jan. 22, 1980

[54] MELT PROCESSABLE THERMOTROPIC WHOLLY AROMATIC POLYESTER

[75] Inventor: Gordon W. Calundann, North Plainfield, N.J.

[73] Assignee: Celanese Corporation, New York, N.Y.

[21] Appl. No.: 877,917

[22] Filed: Feb. 15, 1978

Related U.S. Application Data

[63] Continuation-in-part of Ser. No. 832,147, Sep. 12, 1977, abandoned.

[51] Int. Cl.² .................. C08G 63/18; C08G 63/60
[52] U.S. Cl. ................... 260/40 R; 260/40 P; 528/190; 528/193; 528/206; 528/271
[58] Field of Search ............ 260/47 C, 40 R, 40 P; 528/190, 193, 206, 271

[56] References Cited

U.S. PATENT DOCUMENTS

| | | | |
|---|---|---|---|
| 2,600,376 | 7/1952 | Caldwell | 260/47 |
| 3,039,994 | 7/1962 | Gleim | 260/47 |
| 3,778,410 | 12/1973 | Kuhfuss | 260/47 C |
| 3,884,876 | 5/1975 | Cottis et al. | 260/47 C |
| 3,890,256 | 6/1975 | McFarlane et al. | 260/47 C |

*Primary Examiner*—Lester L. Lee

[57] ABSTRACT

A wholly aromatic polyester is provided which unlike the aromatic polyesters normally encountered in the prior art is not intractable or difficultly tractable and readily undergoes melt processing with ease. The aromatic polyester of the present invention consists essentially of the recurring units (a) p-oxybenzoyl moiety, (b) 2,6-dioxynaphthalene moiety, and (c) terephthaloyl moiety, and is free of units which possess ring substitution. The resulting polyester exhibits a melting point below approximately 325° C., preferably below 300° C., and most preferably below approximately 290° C. The ability of the wholly aromatic polyester to readily undergo melt processing can be attributed to its atypical inherent propensity to form a thermotropic melt phase at relatively low temperatures. The wholly aromatic polyester may be formed by a variety of procedures including a slurry polymerization technique (as defined) or a melt polymerization technique.

15 Claims, No Drawings

MELT PROCESSABLE THERMOTROPIC WHOLLY AROMATIC POLYESTER

CROSS-REFERENCE TO RELATED APPLICATION

This is a continuation-in-part of U.S. Ser. No. 832,147, filed Sept. 12, 1977, and now abandoned.

BACKGROUND OF THE INVENTION

Wholly aromatic polyester resins have long been known. For instance, p-hydroxybenzoic acid homopolymer and copolymers have been provided in the past and are commercially available. Those wholly aromatic polyesters normally encountered in the prior art have tended to be somewhat intractable in nature and to present substantial difficulties if one attempts to melt process the same while employing conventional melt processing procedures. Such polymers commonly are crystalline in nature, relatively high melting or possess a decomposition temperature which is below the melting point, and when molten frequently exhibit an isotropic melt phase. Molding techniques such as compression molding or sintering may be utilized with such materials; however, injection molding, melt spinning, etc. commonly have not been viable alternatives or when attempted commonly have been accomplished with difficulty. Such polymers commonly cannot be melt extruded to form nondegraded fibers. Even those wholly aromatic polymers which exhibit a melting point below their decomposition temperature commonly melt at such high temperatures that quality fibers may not be melt spun. For instance, fibers melt extruded at extremely high temperatures commonly possess a voidy internal structure and diminished tensile properties.

Representative publications which discuss wholly aromatic polyesters include: (a) *Polyesters of Hydroxybenzoic Acids*, by Russell Gilkey and John R. Caldwell, J. of Applied Polymer Sci., Vol. II, Pages 198 to 202 (1959), (b) *Polyarylates (Polyesters From Aromatic Dicarboxylic Acids and Bisphenols)*, by G. Bier, Polymer, Vol. 15, Pages 527 to 535 (August 1974), (c) *Aromatic Polyester Plastics*, by S. G. Cottis, Modern Plastics, Pages 62 to 63 (July 1975), and (d) *Poly (p-Oxybenzoyl Systems): Homopolymer for Coatings: Copolymers for Compression and Injection Molding*, by Roger S. Storm and Steve G. Cottis, Coatings Plast. Preprint, Vol 34, No. 1, pages 194 to 197 (April 1974). See also, U.S. Pat. Nos. 3,039,994; 3,169,121; 3,321,437; 3,553,167; 3,637,595; 3,651,014; 3,723,388; 3,759,870; 3,767,621; 3,787,370; 3,790,528; 3,829,406; 3,890,256; and 3,975,487.

U.S. Pat. No. 3,778,410 discloses a specific technique for the formation of a broadly defined class of polyesters wherein a starting polymer is reacted with an acyloxy aromatic carboxylic acid. The ability of one to provide a specific wholly aromatic polyester which surprisingly exhibits atypical commercially attractive thermotropic properties as presently claimed is not rendered obviously apparent by this generic disclosure.

Also, it recently has been disclosed that certain polyesters may be formed which exhibit melt anistropy. See for instance, (a) *Polyester X7G-A Self Reinforced Thermoplastic*, by W. J. Jackson, Jr., H. F. Kuhfuss, and T. F. Gray, Jr., 30th Anniversary Technical Conference, 1975 Reinforced Plastics/Composites Institute, The Society of the Plastics Industry, Inc., Section 17-D, Pages 1 to 4, (b) Belgian Pat. Nos. 828,935 and 828,936, (c) Dutch No. 7505551, (d) West German Nos. 2,520,819 and 2,520,820, (e) Japanese No. 43-233, (f) U.S. Pat. Nos. 3,991,013 and 3,991,014.

It is an object of the present invention to provide an improved melt processable wholly aromatic polyester.

It is an object of the present invention to provide an improved melt processable wholly aromatic polyester which is free of ring substitution and which is suited for the formation of molded articles and melt extruded fibers.

It is an object of the present invention to provide an improved melt processable aromatic polyester capable of forming a thermotropic melt phase at a temperature below approximatly 325° C., preferably below approximately 300° C. or 290° C.

It is an object of the present invention to provide an improved wholly aromatic polyester which exhibits a melting point well below its decomposition temperature.

In commonly assigned U.S. Ser. No. 832,713, filed Sept. 12, 1977 by Gordon W. Calundann, entitled "Melt Processable Thermotropic Wholly Aromatic Polyester Comprising Both Para-Oxybenzoyl and Meta-Oxybenzoyl Moieties" is claimed a wholly aromatic polyester (as defined) which consists essentially of recurring units of p-oxybenzoyl moiety, m-oxybenzoyl moiety, 2,6-dicarboxynaphthalene moiety, and symmetrical dioxy aryl moiety.

In commonly assigned U.S. Ser. No. 843,993, filed Oct. 20, 1977 by Gordon W. Calundann, entitled "Polyester of 6-Hydroxy-2-Naphthoic Acid and Para-Hydroxy Benzoic Acid Capable of Readily Undergiong Melt Processing", is claimed another improved wholly aromatic polyester.

SUMMARY OF THE INVENTION

It has been found that an improved melt processable wholly aromatic polyester capable of forming a thermotropic melt phase at a temperature below approximately 325° C. consists essentially of the recurring moieties I, II, and III wherein:

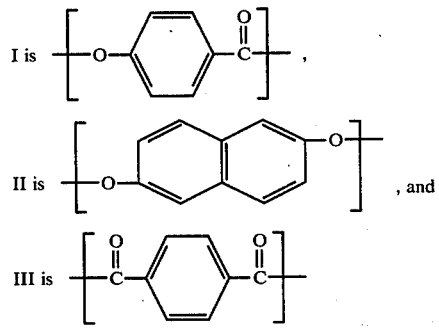

and wherein said polyester comprises approximately 30 to 70 mole percent of moiety I. In a preferred embodiment the thermotropic melt phase is formed at a temperature below approximately 300° C., and most preferably at a temperature below approximately 290° C.

DESCRIPTION OF PREFERRED EMBODIMENTS

The wholly aromatic polyester of the present invention consists essentially of three recurring moieties which when combined in the polyester have been found to form an atypical thermotropic melt phase at a temperature below approximately 325° C., preferably below approximately 300° C., and most preferably below approximately 290° C. It has been found that the melting temperature initially exhibited by the wholly aromatic polymer when it is melted for the first time following its formation may be slightly elevated above the relatively stable or constant temperature at which it melts upon subsequent heatings of the solid polymer. Any reference to melting temperatures referred to herein accordingly is with reference to such subsequent stable melting temperatures exhibited by the unannealed polyester unless otherwise specified. Such stable melting temperatures may be confirmed by the use of a differential scanning calorimeter employing repeat scans at a 20° C. per minute heat-up rate. Each moiety of the wholly aromatic polyester is free of ring substitution other than the linking bonds which form the main polymer chain. Such aromatic polyester is crystalline in nature and because of its ability to exhibit ordered anisotropic properties (i.e., liquid crystals) in the melt readily can be melt processed with ease. The usual difficulties incurred when one attempts to melt process aromatic polyesters by conventional melt processing techniques effectively are eliminated. The aromatic polyester is considered to be "wholly" aromatic in the sense that each moiety present in the same contributes at least one aromatic ring to the polymer backbone.

The wholly aromatic polyester consists essentially of three essential moieties. Moiety I can be termed a p-oxybenzoyl moiety and possesses the structural formula:

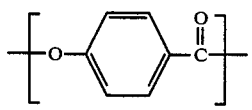

Moiety I comprises approximately 30 to 70 mole percent of the wholly aromatic polyester, and preferably 40 to 60 mole percent, (e.g., 50 mole percent). The melting point of the resulting wholly aromatic polyester tends to be lowered as one incorporates the p-oxybenzoyl moiety in the more preferred quantities.

The second key recurring unit (i.e., moiety II) of the wholly aromatic polyester is a 2,6-dioxynaphthalene moiety of the structural formula:

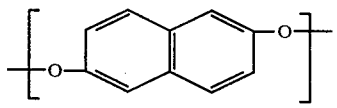

It is essential that moiety II consists of a pair of fused benzene rings as illustrated rather than a single divalent benzene ring. For instance, it has been found that if one were to substitute single benzene rings (i.e., a p-dioxyphenylene moiety) for a substantial portion of the naphthalene rings of moiety II, the properties of the resulting wholly aromatic polyester would be substantially different and adversely influenced as evidenced by substantially higher flow and melt temperatures greater than 350° C. resulting in significant degradation on processing. Commonly, moiety II comprises approximately 15 to 35 percent of the wholly aromatic polyester, and preferably approximately 20 to 30 mole percent (e.g., approximately 25 mole percent) when forming a preferred wholly aromatic polyester.

The third key recurring unit (i.e., moiety III) of the wholly aromatic polyester is a terephthaloyl moiety of the formula:

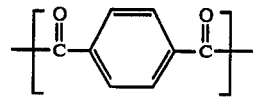

Commonly moiety III comprises approximately 15 to 35 mole percent of the wholly aromatic polyester, and preferably approximately 20 to 30 mole percent (e.g., approximately 25 mole percent).

Other ester-forming moieties (e.g. dicarboxy or dioxy units) other than those previously discussed additionally may be included in the wholly aromatic polyester of the present invention in a minor concentration so long as such moieties do not adversely influence the desired thermotropic melt phase exhibited by the polyester heretofore defined and do not raise the melting point of the resulting polymer above that specified. As will be apparent to those skilled in the art, the total molar quantities of dicarboxy units and dioxy units present within the wholly aromatic polyester will be substantially equal. For instance, the molar quantities of moieties II and III commonly are substantially equal. The various moieties upon polymer formation will tend to be present in a random configuration.

The wholly aromatic polyesters of the present invention commonly exhibit

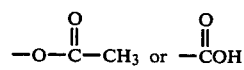

end groups depending upon the synthesis route selected. As will be apparent to those skilled in the art, the end groups optionally may be capped, e.g., acidic end groups may be capped with a variety of alcohols, and hydroxyl end groups may be capped with a variety of organic acids. For instance, end capping units such as phenylester

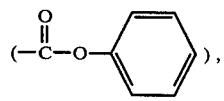

and methylester

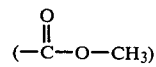

optionally may be included at the end of the polymer chains. The polymer also may be oxidatively crosslinked to at least some degree, if desired, by heating in an oxygen-containing atmosphere (e.g., in air) while in bulk form or as a previously shaped article at a temperature below its melting point for a limited period of time (e.g., for a few minutes).

The wholly aromatic polyesters of the present invention tend to be substantially insoluble in all common polyester solvents, such as hexafluoroisopropanol and o-chlorophenol, and accordingly are not susceptible to solution processing. They can surprisingly be readily processed by common melt processing techniques as discussed hereafter. Some solubility is discernable in pentafluorophenol.

The wholly aromatic polyesters commonly exhibit a weight average molecular weight of about 2,000 to 200,000, and preferably about 10,000 to 25,000, e.g., about 20,000 to 22,000. Such molecular weight may be determined by standard techniques not involving the solutioning of the polymer, e.g., by end group determination via infra red spectroscopy on compression molded films.

The wholly aromatic polyesters additionally commonly exhibit an inherent viscosity (i.e., I.V.) of approximately 0.5 to 7, preferably 4 to 6, and most preferably 4.5 to 5.5 when dissolved in a concentration of 0.1 percent by weight in pentafluorophenol at 60° C.

The wholly aromatic polyesters of the present invention can be considered crystalline in the sense that fibers melt extruded therefrom exhibit X-ray diffraction patterns using Ni-filtered CuKα radiation and flat plate cameras characteristic of polymeric crystalline materials. In spite of the crystallinity observed, the wholly aromatic polyesters of the present invention nevertheless may be easily melt processed.

Unlike the aromatic polyesters commonly encountered in the prior art the wholly aromatic polyesters of the present invention are not intractable and form a thermotropic melt phase whereby an atypical degree of order is manifest in the molten polymer. The subject polyester readily forms liquid crystals in the melt phase and accordingly exhibits a high tendency for the polymer chains to orient in the shear direction. Such thermotropic properties are manifest at a temperature which is amenable for melt processing to form shaped articles. Such anisotropy in the melt may be confirmed by conventional polarized light techniques whereby cross-polaroids are utilized. More specifically, the thermotropic melt phase may conveniently be confirmed by the use of a Leitz polarizing microscope at a magnification of 40× with the sample on a Leitz hot stage and under a nitrogen atmosphere. The polymer melt is optically anisotropic, i.e., it transmits light when examined between crossed polaroids. The amount of light transmitted increases when the sample is sheared (i.e., is made to flow), however, the sample is optically anisotropic even in the static state. On the contrary, typical aromatic polyesters do not transmit light to any substantial degree when examined under identical conditions.

The wholly aromatic polyester of the present invention may be formed by a variety of ester-forming techniques whereby organic monomer compounds possessing functional groups which upon condensation form the requisite recurring moieties are reacted. For instance, the functional groups of the organic monomer compounds may be carboxylic acid groups, hydroxyl groups, ester groups, acid halides, etc. For instance, the organic monomer compounds may be reacted in the absence of a heat exchange fluid. They accordingly may be heated initially via a solid phase condensation procedure with the temperature being progressively raised until it exceeds the polymer's melting point and with the reaction continuing via a melt condensation procedure. A vacuum may be applied to facilitate removal of volatiles formed during the condensation (e.g., acetic acid or water). Also a slurry system may be utilized initially with the reaction being completed in the melt.

As set forth in commonly assigned U.S. Ser. No. 686,189, filed May 13, 1976 (now U.S. Pat. No. 4,067,852), of Gordon W. Calundann, entitled "Improved Melt Processable Thermotropic Wholly Aromatic Polyester and Process for Its Production" is described a slurry polymerization process which may be employed to form the wholly aromatic polyester of the present invention. The disclosure of this copending application is herein incorporated by reference.

More specifically, in such technique, the organic monomer reactants from which the p-oxybenzoyl moiety (i.e., moiety I) and the 2,6-dioxynaphthalene moiety (i.e., moiety II) are derived are initially provided in a modified form whereby the usual hydroxyl groups of these monomers are esterified (i.e., they are provided as acyl esters). For instance, lower acyl esters of p-hydroxy benzoic acid wherein the hydroxyl group is esterified and lower acyl diesters of aryl diols may be provided as reactants. The lower acyl groups preferably have from 2 to about 4 carbon atoms. Preferably the acetate esters of the organic compounds which form moieties I and II are provided. Accordingly, particularly preferred reactants for condensation with terephthalic acid are p-acetoxybenzoic acid, 2,6-naphthalene diacetate and terephthalic acid. If minor quantities of other aryl reactants (as previously discussed) optionally provide oxy-units within the resulting polymer, these too preferably are provided as the corresponding lower acyl esters.

Relative quantities of organic monomer reactants are provided in the reaction zone so that the potential dicarboxy units and dioxy units available for incorporation in the resulting wholly aromatic polyester are substantially equal.

In accordance with a slurry polymerization technique the reactants (e.g., p-acetoxybenzoic acid, 2,6-naphthalene diacetate, and terephthalic acid) are provided in an inert heat exchange medium which preferably serves as a solvent for at least one of the reactants. Typically, the terephthalic acid reactant is substantially insoluble in the inert heat exchange medium and is present therein as a finely divided solid. As the polymer forms, it is insoluble in the inert heat exchange medium and assumes the configuration of a fine dispersion. The heat exchange medium preferably possesses a boiling point in excess of the maximum polymerization temperature utilized. Those inert heat exchange media having boiling ranges of about 350° to 400° C. are particularly preferred. Representative heat exchange media include the terphenyls: a eutectic mixture of 73.5 percent diphenyl oxide and 26.5 percent diphenyl, commercially available from the Dow Chemical Co. under the trademark Dowtherm A; and mixtures of polychlorinated polyphenyls such as chlorinated biphenyls typified by those commercially available from the Monsanto Co. under the trademark Therminol FR; terphenyls and mixtures thereof such as those composed of meta and para isomers commercially available from the Monsanto Co. under the trademark Therminol (e.g., Therminol 88, 77, or 66); diphenylsulfone; other arylsulfones, such as substituted diphenyl sulfones (e.g., ditolylsulfone), etc. The relative quantity (weight:weight) of inert heat exchange medium to reactants in the reaction zone typically is in the ratio of heat exchange medium to total reactants of about 0.2:1 to 4:1, and most preferably about 2:1.

The slurry polymerization reaction may be carried out on a batch, continuous, or semicontinuous basis. Typical polymerization reactions commonly are carried out at a temperature of at least about 200° C. up to a temperature below the melting temperature of decomposition temperature of the resulting wholly aromatic polyester, e.g., at about 200° to 275° C. In a preferred embodiment of the slurry process the temperature of the slurry is increased as the polymerization reaction progresses. A gradual or stepwise temperature increase during the polymerization has been found to insure the formation of a superior product. The polymerization reaction is preferably carried out with agitation at atmospheric pressure under an inert gas blanket with the condensation reaction by-products (e.g., acetic acid) being continuously removed from the reaction zone. Superatmospheric or subatmospheric pressures optionally can be utilized usually without commensurate advantage. Typical reaction times commonly range from about 2 to 30 hours, or more, with the lesser reaction times being possible when the reaction is catalyzed.

Representative catalysts for use in the process include dialkyl tin oxide (e.g., dibutyl tin oxide), diaryl tin oxide, titanium dioxide, alkoxy titanium silicates, titanium alkoxides, alkali and alkaline earth metal salts of carboxylic acids, the gaseous acid catalysts such as Lewis acids, hydrogen halides (e.g., HCl), etc. The quantity of catalyst utilized typically is about 0.001 to 1 percent by weight based upon the total monomer weight, and most commonly about 0.01 to 0.2 percent by weight.

At the conclusion of the polymerization reaction the solid particulate wholly aromatic polyester (as defined) is recovered by any convenient technique. For instance, the solid particulate polymer conveniently may be separated from the inert heat exchange medium (preferably following cooling), by decantation, centrifugation, or filtration. It is then washed, and is dried. During the washing, residual heat exchange medium adhering to the product may be removed by acetone, alcohols, lower hydrocarbons, methylene chloride, chloroform, benzene, toluene, etc., or any other relatively volatile solvent in which the heat exchange medium is soluble.

The wholly aromatic polyester of the present invention readily can be melt processed to form a variety of shaped articles, e.g., molded three dimensional articles, fibers, or films. The polyester of the present invention is suited for molding applications and may be molded via standard injection molding techniques commonly utilized when forming molded articles. Unlike the wholly aromatic polyesters commonly encountered in the prior art it is not essential that more severe injection molding conditions (e.g., higher temperatures), compression molding, impact molding, or plasma spraying techniques be utilized. Fibers or films may be melt extruded.

When forming fibers and films the extrusion orifice may be selected from among those commonly utilized during the melt extrusion of such shaped articles. For instance, the shaped extrusion orifice may be in the form of a rectangular slit when forming a polymeric film. When forming a filamentary material the spinneret selected may contain one and preferably a plurality of extrusion orifices. For instance a standard conical spinneret containing 1 to 200 holes (e.g., 6 to 200 holes) such as commonly used in the melt spinning of polyethylene terephthalate, having a diameter of about 5 to 60 mils (e.g., 10 to 40 mils) may be utilized. Yarns of about 20 to 36 continuous filaments are commonly formed. The melt-spinnable wholly aromatic polyester is supplied to the extrusion orifice at a temperature above its melting point, e.g., a temperature of about 280° to 320° C.

Subsequent to extrusion through the shaped orifice the resulting filamentary material or film is passed in the direction of its length through a solidification or quench zone wherein the molten filamentary material or film is transformed to a solid filamentary material or film. The resulting fibers commonly have a denier per filament of about 2 to 50, and preferably a denier per filament of about 2 to 20.

The resulting filamentary or film optionally may be subjected to a thermal treatment whereby its physical properties are further enhanced. The tenacity of the fiber or film particularly is increased by such thermal treatment. More specifically, the fibers or films may be thermally treated in an inert atmosphere (e.g., nitrogen, argon, helium or steam) or in a flowing oxygen-containing atmosphere (e.g., air) with or without stress at a temperature below the polymer melting point until the desired property enhancement is achieved. Thermal treatment times commonly range from a few minutes to several days. As the fiber is thermally treated, its melting temperature progressively is raised. The temperature of the atmosphere may be staged or continuously increased during the thermal treatment or held at a constant level. For instance, the fiber may be heated at 250° C. for one hour, at 260° C. for one hour, and at 270° C. for one hour. Alternatively, the fiber may be heated at about 15° to 20° C. below the temperature at which it melts for about 48 hours. Optimum heat treatment conditions will vary with the specific composition of the wholly aromatic polyester.

The as-spun fibers formed from the wholly aromatic polyester of the present invention are fully oriented and exhibit highly satisfactory physical properties which render them suitable for use in high performance applications. The as-spun fibers commonly exhibit an average single filament tenacity of at least 5 grams per denier (e.g., about 5 to 11 grams per denier), and average single filament tensile modulus of at least about 300 grams per denier (e.g., about 400 to 700 grams per denier), and exhibit an extraordinary retention of physical properties and dimensional stability at elevated temperature (e.g., at temperatures of about 150° to 200° C.). Following thermal treatment (i.e., annealing) the fibers commonly exhibit an average single filament tenacity of at least 10 grams per denier (e.g., 10 to 30 grams per denier), and an average single filament tensile modulus of at least 300 grams per denier measured at ambient conditions (e.g., 72° F. and 65 percent relative humidity). Such properties enable the fibers to be used with particular advantage as tire cords and in other industrial applications, such as conveyor belts, hose, cabling, resin reinforcement, etc. Films formed of the wholly aromatic polyester of the present invention may be used as strapping tape, cable wrap, magnetic tape, electric motor dielectric film etc. The fibers and films exhibit an inherent resistance to burning.

The following examples are presented as specific illustrations of the claimed invention. It should be understood, however, that the invention is not limited to the specific details set forth in the examples.

EXAMPLE I

To a three-neck, round bottom flask equipped with a stirrer, nitrogen inlet tube, and a heating tape wrapped distillation head connected to a condenser are added the following:

(a) 54.04 grams p-acetoxybenzoic acid (0.30 mole),
(b) 36.63 grams 2,6-naphthalene diacetate (0.15 mole), (c) 24.92 grams terephthalic acid (0.15 mole).

This mixture is brought to a temperature of 250° C. At 250° C. most of the terephthalic acid is suspended as a finely divided solid in a molten solution of p-acetoxybenzoic acid and 2,6-naphthalene diacetate. The contents of the flask are stirred rapidly at 250° C. under a slow stream of dry nitrogen for about 2 hours while acetic acid is distilled from the polymerization vessel. The polymerization suspension is then raised to a temperature of 280° C. and is stirred at this temperature for 1 hour under a nitrogen flow while additional acetic acid is evolved. About 40 ml. of acetic acid is collected during these stages. The polymerization temperature is next increased to 320° C. The viscous polymer melt is held for 15 minutes at 320° C. under a nitrogen flow and then subjected to a series of reduced pressure stages. The nitrogen is shut off and the pressure is reduced to about 300 mm. of mercury for about 20 minutes, 210 mm. for 15 minutes, 70 mm. for 15 minutes and finally about 0.2 mm. for 10 minutes. During these periods the polymer melt continues to increase in viscosity and is stirred more slowly while the remaining acetic acid is removed from the reaction vessel. The polymer melt is next allowed to cool to ambient temperature (i.e., about 25° C.). Upon cooling, the polymer plug is finely ground in a Wiley Mill and dried in a forced air oven at 100° C. for 50 to 60 minutes.

The resulting product consists of 75 grams (i.e., about 94% of theory) of the wholly aromatic polyester. The inherent viscosity (I.V.) of the polymer is approximately 2.3 as determined in pentafluorophenol solution of 0.1 percent by weight concentration at 60° C.

$$I.V. = \frac{\ln(\eta\ rel)}{c}$$

where c = concentration of solution (0.1 percent by weight), and $\eta rel$ = relative viscosity.

When the product is subject to differential scanning calorimetry, it exhibits a large sharp endotherm at about 285° C. (peak), which repeats at about 285° C. on subsequent remelt scans. The polymer melt is thermotropic.

When the melt is cooled in a differential scanning calorimeter at a rate of −20° C./min., a sharp polymer crystallization exotherm is observed at about 232° C. (peak) indicating a rapid crystallization.

The resulting wholly aromatic polyester next is melt extruded to form oriented fibers directly from the melt or injection molded to form three-dimensional shaped articles.

EXAMPLE II

To a three-neck, round bottom flask equipped with a stirrer, argon inlet tube, and a heating tape wrapped distillation head connected to a condenser were added the following:

(a) 75.65 grams p-acetoxybenzoic acid (0.42 mole),
(b) 34.19 grams 2,6-naphthalene diacetate (0.14 mole),
(c) 23.26 grams terephthalic acid (0.14 mole), and
(d) 0.2 grams anhydrous sodium acetate.

The charged flask was vacuum purged with argon three times and brought to a temperature of 250° C. At 250° C. the white reaction slurry was stirred rapidly under a slow stream of dry argon while acetic acid was distilled from the polymerization vessel. The polymerization mixture was stirred for 3 hours and 15 minutes at 250° C., and then for 3 hours and 25 minutes at 280° C. About 35 ml. of acetic acid were collected during these stages. The polymerization temperature was next increased to 320° C. and then subjected to a reduced pressure stage. The argon flow was halted and the pressure of the stirred melt was reduced to about 0.1 to 0.2 mm. of mercury in about 10 minutes and maintained at this pressure level for about 1 hour. During this period the opalescent polymer melt continued to increase in viscosity and was stirred more slowly while the remaining acetic acid was removed from the reaction vessel. After cooling to ambient, the polymer plug was ground and dried in a forced air oven at 150° C. for about 1 hour.

The resulting polyester had an inherent viscosity (I.V.) of 3.91 as determined in a pentafluorophenol solution of 0.1 percent by weight concentration at 60° C.

$$I.V. = \frac{\ln(\eta\ rel)}{c}$$

where c = concentration of solution (0.1 percent by weight), and $\eta rel$ = relative viscosity. The relative viscosity was measured by dividing the flow time for the pure solvent.

The I.V. of this polymer was increased to about 4.9 by subjecting the finely divided polyester to a solid phase polymerization procedure. This involved maintaining a flow of dry nitrogen at atmospheric pressure through the ground polymer at 250° C. for about 24 hours.

When the solid phase polymerized sample was subjected to differential scanning calorimetry, it showed a sharp melt endotherm at about 305° C. (peak), which repeated at about 298° C. on subsequent remelt scans. The polymer melt is thermotropic.

The polymer was melt extruded into a continuous filament of approximately 26 denier per filament. More specifically, the polymer melt while at a temperature of about 355° C. was extruded through a spinneret provided with a single hole jet having a diameter of 7 mils and a length of 10 mils. The extruded filament was quenched in ambient air (i.e., at 72° F. and 65 percent relative humidity). The as-spun filament was taken up at a rate of 52 meters per minute.

The resulting as-spun wholly aromatic polyester fiber exhibited the following average single filament properties:

| | |
|---|---|
| tenacity (grams per denier) | 8.5 |
| tensile modulus (grams per denier) | 520 |
| elongation (percent) | 1.93 |

Following thermal treatement in a dry nitrogen flow at 250° C. for 64 hours, the fiber exhibited the following average single filament properties:

| | |
|---|---|
| tenacity (grams per denier) | 15.1 |
| tensile modulus (grams per denier) | 576 |
| elongation (percent) | 2.88 |

The fiber also shows a low degree of shrinkage at elevated temperatures, good retention of strength and tensile modulus values at temperatures up to about 150° to 200° C., and excellent hydrolytic stability.

Although the invention has been described with preferred embodiments it is to be understood that variations and modifications may be employed without departing from the concept of the invention as defined in the following claims.

I claim:

1. An improved melt processable wholly aromatic polyester capable of forming a thermotropic melt phase at a temperature below approximately 325° C. consisting essentially of the recurring moieties I, II, and III wherein:

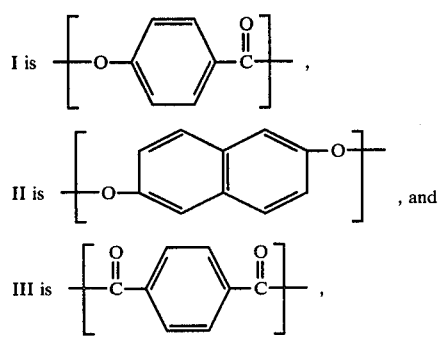

wherein said polyester comprises approximately 30 to 70 mole percent of moiety I, and wherein each of said moieties of said polyester is free of ring substitution.

2. A melt processable wholly aromatic polyester according to claim 1 which is capable of forming a thermotropic melt phase below approximately 300° C.

3. A melt processable wholly aromatic polyester according to claim 1 which is capable of forming a thermotropic melt phase below approximately 290° C.

4. A melt processable wholly aromatic polyester according to claim 1 wherein the molar quantities of moieties II and III are substantially equal.

5. A melt processable wholly aromatic polyester according to claim 1 which comprises approximately 30 to 70 mole percent of moiety I, approximately 15 to 35 mole percent of moiety II, and approximately 15 to 35 mole percent of moiety III.

6. A molded article comprising the melt processable wholly aromatic polyester of claim 1.

7. A molding compound comprising the melt processable wholly aromatic polyester of claim 1 which incorporates approximately 1 to 60 percent by weight of a solid filler and/or reinforcing agent.

8. A fiber which has been melt spun from the wholly aromatic polyester of claim 1.

9. An improved melt processable wholly aromatic polyester capable of forming a thermotropic melt phase at a temperature below approximately 300° C. consisting essentially of the recurring moieties I, II, and III wherein:

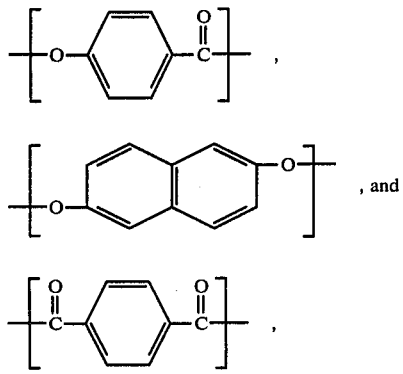

wherein the polyester comprises approximately 40 to 60 mole percent of moiety I, approximately 20 to 30 mole percent of moiety II, and approximately 20 to 30 mole percent of moiety III, and wherein each of said moieties of said polyester is free of ring substitution.

10. A melt processable wholly aromatic polyester according to claim 9 which is capable of forming a thermotropic melt phase below approximately 290° C.

11. A melt processable wholly aromatic polyester according to claim 9 wherein the molar quantities of moieties II and III are substantially equal.

12. A melt processable wholly aromatic polyester according to claim 9 which comprises approximately 50 mole percent of moiety I, approximately 25 mole percent of moiety II, and approximately 25 mole percent of moiety III.

13. A molded article comprising the melt processable wholly aromatic polyester of claim 9.

14. A molding compound comprising the melt processable wholly aromatic polyester of claim 9 which incorporates approximately 1 to 60 percent by weight of a solid filler and/or reinforcing agent.

15. A fiber which has been melt spun from the wholly aromatic polyester of claim 9.

* * * * *